United States Patent [19]

Inda et al.

[11] Patent Number: 5,397,155
[45] Date of Patent: Mar. 14, 1995

[54] AIR DUCT FITTING

[75] Inventors: John P. Inda, Shawnee; Joseph J. Inda, Tecumseh, both of Okla.

[73] Assignee: General Plastics, Inc., Shawnee, Okla.

[21] Appl. No.: 92,713

[22] Filed: Jul. 16, 1993

Related U.S. Application Data

[63] Continuation-in-part of Ser. No. 852,414, Mar. 16, 1992, Pat. No. D. 348,097.

[51] Int. Cl.6 ............................................. F16L 35/00
[52] U.S. Cl. ..................................... 285/4; 285/179
[58] Field of Search ...................................... 285/2–4, 285/179, 184

[56] References Cited

U.S. PATENT DOCUMENTS

| 567,231 | 9/1896 | Glauber . | |
|---|---|---|---|
| 925,762 | 6/1909 | Eager . | |
| 1,783,605 | 12/1930 | Della | 285/4 |
| 1,814,800 | 7/1931 | Heeter | 285/2 |
| 2,086,007 | 7/1937 | Tompkins | 285/105 |
| 2,215,318 | 9/1940 | Bristol | 138/75 |
| 2,344,424 | 3/1944 | Singleton | 285/179 X |
| 2,449,265 | 9/1948 | Williams | 285/4 X |
| 2,756,076 | 7/1956 | Rodriguez | 285/4 |
| 3,916,929 | 11/1975 | Brown | 285/4 X |
| 4,022,497 | 5/1977 | Kotsakis | 285/4 |
| 4,653,777 | 3/1987 | Kawatsu | 285/179 X |
| 5,054,513 | 10/1991 | Trueb | 285/4 X |

FOREIGN PATENT DOCUMENTS

| 2394736 | 2/1979 | France | 285/4 |
|---|---|---|---|
| 10085 | of 1898 | United Kingdom | 285/4 |

OTHER PUBLICATIONS

Brochure of Northern Pipe Products, GPK Products, Inc., undated but admitted to be prior art.

Primary Examiner—Dave W. Arola
Attorney, Agent, or Firm—Dougherty, Hessin, Beavers & Gilbert

[57] ABSTRACT

An air duct fitting or pipe coupling used for connecting air conditioning or heating ducts. The fitting may be used as an integral unit to connect the ducts at a predetermined angular relationship from one another. The fitting may be severed into two sections, each section of which may be used to connect ducts at a different angular relationship from the integral unit. The fitting may be characterized as an elbow fitting. In the preferred embodiment, the fitting is a thin wall molded unit made of a non-metallic material. The first and second sections may be severed along a plane defined by a V-shaped groove molded in the fitting.

22 Claims, 3 Drawing Sheets

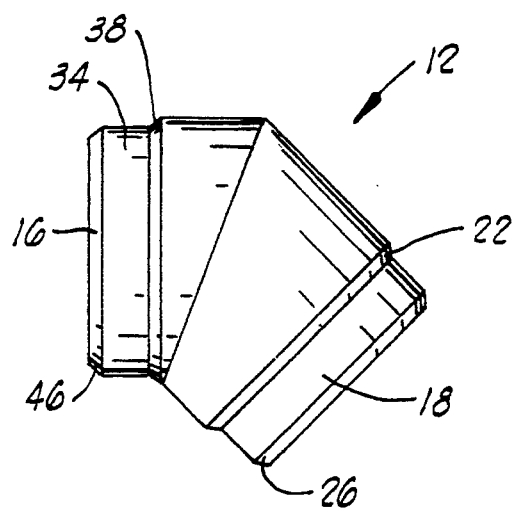
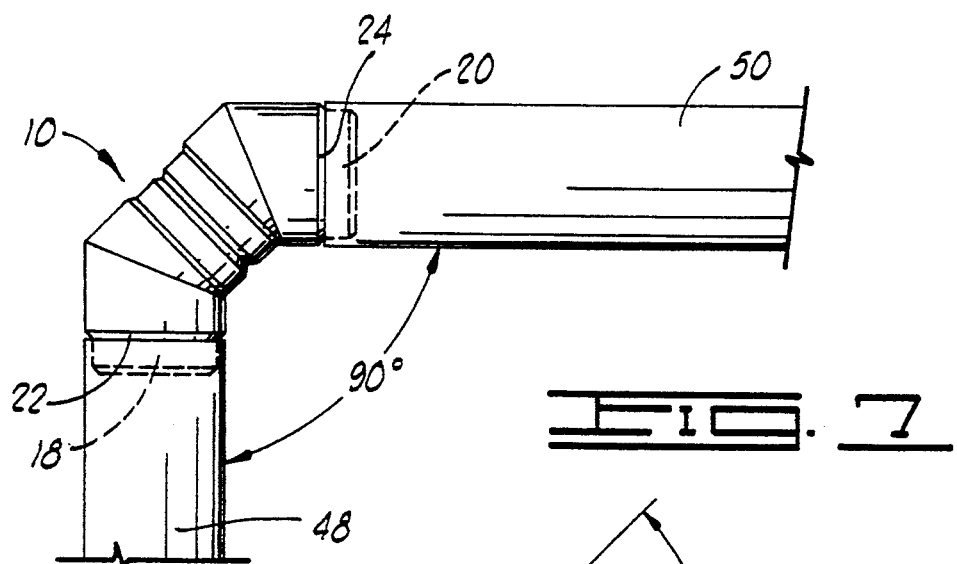
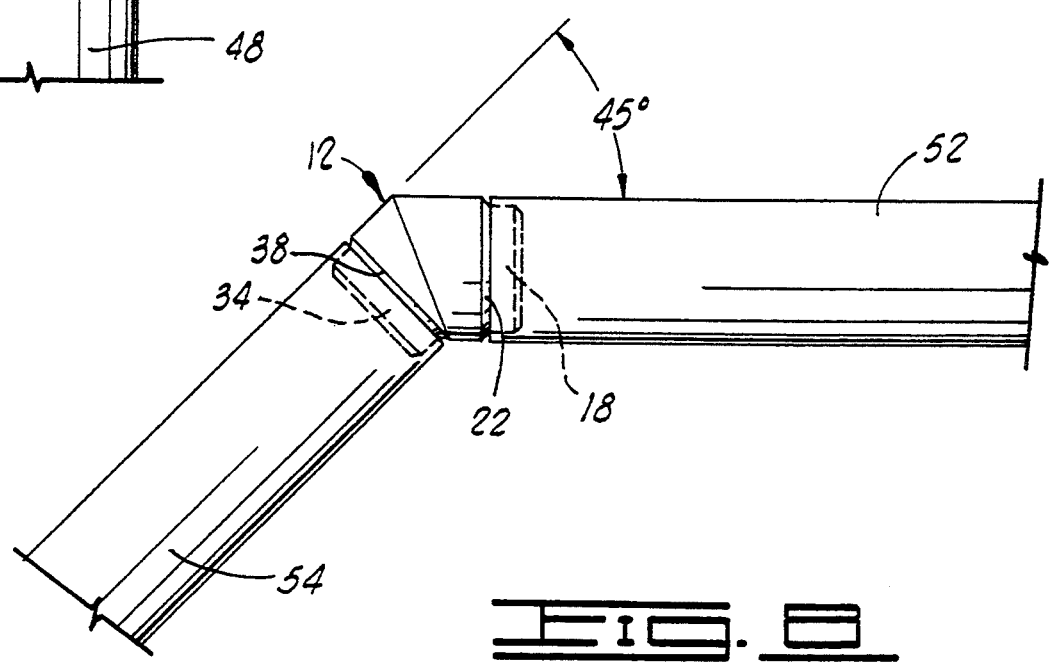

AIR DUCT FITTING

This is a continuation-in-part of prior Design patent application Ser. No. 07/852,414, filed Mar. 16, 1992, now U.S. Pat. No. 348,097 issued Jun. 21, 1994.

BACKGROUND OF THE INVENTION

1. Field Of The Invention

This application relates to air duct fittings which may also be referred to as pipe couplings, and more particularly, to a non-metallic air duct fitting molded in one piece, such as an elbow, but which may be separated into two separate components.

2. Description Of The Prior Art

In the construction of buildings which are provided with central heating and air conditioning, a network of ducts is extended from a central source of heat or cool air into the various rooms for discharging the heated or cooled air into the rooms. At the ground level, these ducts are frequently laid horizontally within or beneath a slab or pad from the central location where the cooling or heating of the air duct is developed. Depending upon the architectural layout of the building, the ducting can follow virtually any path and be laid out with various runs of the ducts at different angles from one another. In other words, the variations on the ducting circuit are virtually limitless.

One type of air duct which has been utilized is metallic (usually galvanized sheet metal), and such ducts are used extensively. Generally, the ducting is of cylindrical configuration with fittings, such as elbows, tees, unions, etc., being used to join the fittings together for the desired ducting layout.

A limitation of such prior art ducting fittings is that each is made for a specific purpose. For example, if two lengths of duct are being connected perpendicular to one another, a 90° elbow may be used. If the lengths of duct are being connected together at a different angle, such as 45°, then a separate 45° elbow is necessary.

The air duct fitting of the present invention solves this problem by providing a molded, non-metallic fitting, such as an elbow, which is molded as an integral unit for one angular relationship between open ends thereof, such as 90°, and which may be easily cut into more than one separate fitting having a different angular relationship between open ends thereof, such as 45°.

Another problem with metallic fittings is that they are prone to rusting as a result of moisture condensation in the air duct network. The non-metallic fittings of the present invention are not susceptible to such rusting failure.

SUMMARY OF THE INVENTION

The present invention is an air duct fitting, also referred to as a pipe coupling, which is preferably made of a non-metallic material and used to connect lengths of duct together. The fitting comprises a plurality of integrally formed sections including at least a first section and a second section. The fitting may be used as an integral unit to connect the ducts at a predetermined angular relationship to one another, and the sections may be severed from one another and separately used to connect the ducts at a different angular relationship to one another. Adjacent sections are initially integrally connected along a common plane, and the sections are separated by cutting along this plane.

In one preferred embodiment, but not by way of limitation, the integral unit may connect the ducts at an angle of approximately 90°, and the severed first and second sections may each connect the ducts at an angle of approximately 45°.

The fitting also comprises a reduced diameter portion formed on one end of the fitting, this reduced diameter portion being a part of the first section, and another reduced diameter portion formed on another end of the fitting. This second reduced diameter portion is a part of the second section.

The fitting also comprises a pair of adjacent reduced diameter portions formed in an intermediate area on the fitting. One of the adjacent reduced diameter portions is part of the first section, and the other of the adjacent reduced diameter portions is a part of the second section. Preferably, a V-shaped groove is defined between the adjacent reduced diameter portions. The apex of this V-shaped groove defines the plane along which the first and second sections may be severed from one another.

An important object of the invention is to provide an air duct fitting or pipe coupling which may be used to connect a pair of ducts, wherein the fitting may be severed into multiple sections which can be individually used to connect a pair of ducts.

Another object of the invention is to provide an air duct fitting for connecting ducts at a predetermined angular relationship to one another, wherein the fitting may be severed into multiple sections such that each of the sections may be used to connect ducts at a different angular relationship.

A further object of the invention is to provide an air duct fitting which may be severed into two sections along a common plane.

Still another object of the invention is to provide an elbow fitting which may be used to connect a pair of ducts at approximately a 90° angle or alternatively cut in half to provide two half sections, each of which may be used to connect a pair of ducts at approximately a 45° angle.

Additional objects and advantages of the invention will become apparent as the following detailed description of the preferred embodiment is read in conjunction with the drawings which illustrate such embodiment.

BRIEF DESCRIPTION OF THE DRAWINGS

FIG. 6 illustrates an elevational view of one-half of the air duct fitting shown in FIG. 1, after the duct has been cut into two pieces.

FIG. 7 illustrates the air duct fitting in position connecting two lengths of duct together at one angle.

FIG. 8 illustrates a cut-off portion of the air duct fitting connecting two lengths of duct together at another angle.

DETAILED DESCRIPTION OF THE PREFERRED EMBODIMENT

Figure 1:
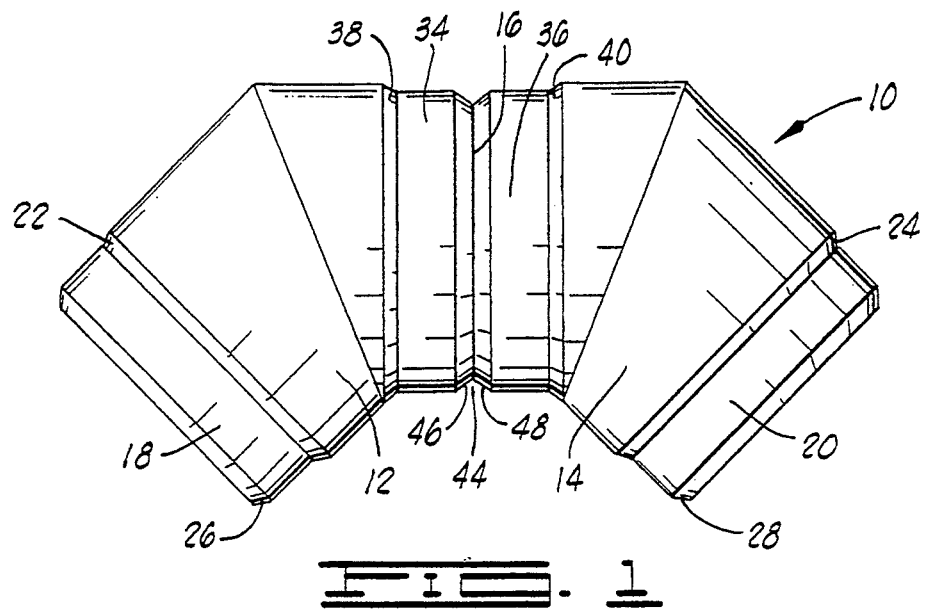
FIG. 1 is an elevational view of the pipe coupling or air duct fitting of the present invention.
Figure 2:
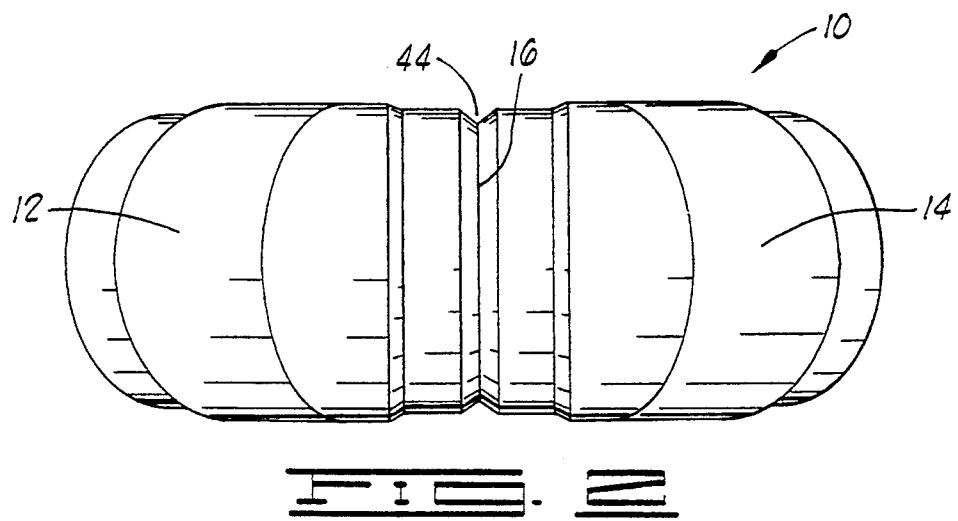
FIG. 2 is a plan view of the fitting as seen from the top of FIG. 1.

Referring now to the drawings, and more particularly to FIGS. 1–5, the air duct fitting or pipe coupling of the present invention is shown and generally designated by the numeral 10. Fitting 10 is illustrated as a 90° elbow comprising first and second half sections 12 and 14. Half sections 12 and 14 are identical in one preferred embodiment, but the invention is not necessarily intended to be so limited. Further, the invention is directed to a fitting with multiple sections and is not intended to be limited to only two.

Fitting 10 is integrally formed of a non-metallic material, such as a synthetic resin. Stated in another way, first and second half sections 12 and 14 are initially integrally joined together along a common plane 16. Fitting 10 may be used in its original, integral form to join lengths of duct together, as will be further discussed herein. Also, first and second half sections 12 and 14 are severable along plane 16 and may be used as separate components to join lengths of duct together.

Fitting 10 has a first reduced diameter portion 18 which is part of first half section 12 and a similar or identical reduced diameter portion 20 which is part of second half section 14. Reduced diameter portions 18 and 20 are adapted to fit within an end of a duct. Chamfers 26 and 28 assist in guiding the length of duct onto reduced diameter portions 18 and 20, respectively. The duct is located with respect to pipe coupling 10 by abutment of the end of the duct adjacent to the corresponding shoulder 22 and 24.

Figure 4:
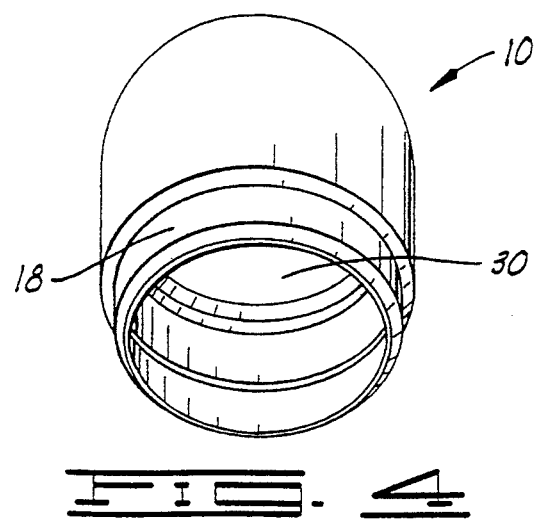
FIG. 4 shows an end view as seen from the left of FIG. 1. A right end view is substantially identical.
Figure 3:
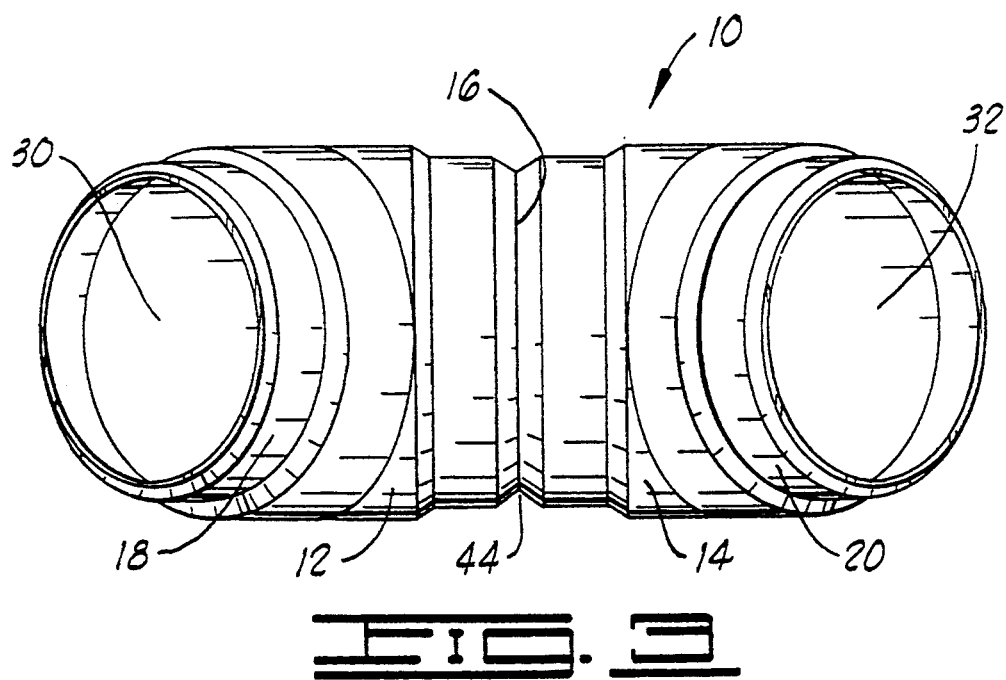
FIG. 3 is a plan view of the fitting as viewed from the bottom of FIG. 1.
Figure 5:
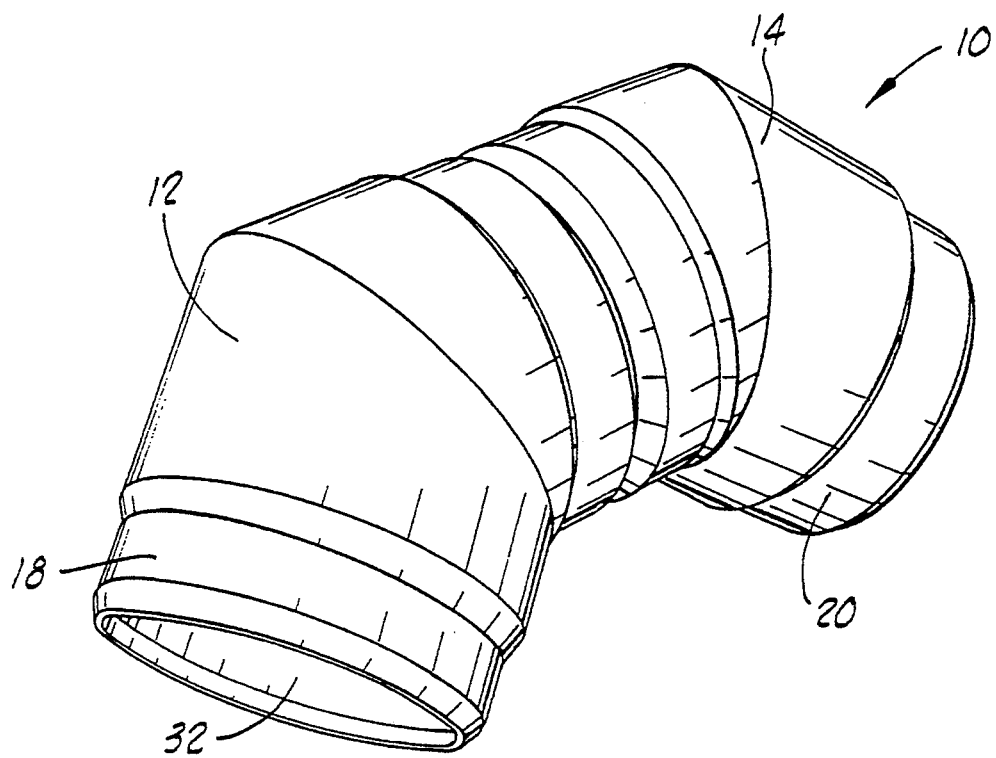
FIG. 5 is a perspective view of the pipe coupling or air duct fitting.

Referring to FIGS. 3 and 4, fitting 10 has a hollow, thin wall construction. Reduced diameter portions 18 and 20 define openings 30 and 32, respectively, into fitting 10. Of course, openings 30 and 32 are in communication with one another through the fitting.

In an intermediate portion of fitting 10 through which plane 16 is defined, the fitting has two additional reduced diameter portions 34 and 36 which are disposed adjacent to each other and on opposite sides of plane 16. Thus, reduced diameter portion 34 is seen to be part of first half section 12, and similarly, reduced diameter portion 36 is part of second half section 14. First half section 12 has a shoulder 38 formed thereon adjacent to reduced diameter portion 34. A similar shoulder 40 is formed on second half section 14 adjacent to reduced diameter portion 36.

A generally V-shaped groove 44 is defined by a pair of opposed chamfers 46 and 48 between reduced diameter portions 34 and 36. The apex of groove 44 will be seen to lie along plane 16. In other words, chamfers 46 and 48 are initially joined along plane 16 and thus form the junction between first and second half sections 12 and 14.

Fitting 10 may be cut along plane 16 to sever first and second half sections into two separate components. For example, referring now to FIG. 6, first half section 12 is shown as a separate unit. Second half section 14 would be substantially identical.

In operation, fitting 10 or first and second half sections 12 and 14 may be used to join a pair of lengths of duct. Referring to FIG. 7, an unsevered pipe coupling 10 is shown connecting a pair of ducts 48 and 50. Duct 48 is positioned over reduced diameter portion 18 and generally abutted against shoulder 22. Similarly, duct 50 is shown positioned over reduced diameter portion 20 and generally abutting shoulder 24 of fitting 10. Ducts 48 and 50 are permanently joined to fitting 10, and sealed therewith, such as by an adhesive or cementing means known in the art. The adhesive may be placed on reduced diameter portions 18 and 20 before ducts 48 and 50 are positioned thereon. Once the adhesive sets, all of the components are bonded together.

As illustrated in FIG. 7, the complete, unsevered air duct fitting 10 provides a 90° connection between ducts 48 and 50. It should be understood that the invention is not necessarily intended to be limited to any particular angular configuration, but it is anticipated that a 90° connection would be one which would be frequently used.

Referring now to FIG. 8, a severed half section 12 is shown connecting a pair of ducts 52 and 54. Duct 52 is positioned over reduced diameter portion 18 and abutting shoulder 22 as previously described. Similarly, duct 54 is positioned over reduced diameter portion 34 and abutting shoulder 38. Again, an adhesive bonding means of a kind known in the art is used to bond all of the components together.

It will be seen in FIG. 8 that, since first half section 12 is a severed unit, the half section provides a connection between ducts 52 and 54 such that the ducts are disposed at a 45° angle from one another, or half the angle of complete fitting 10. Although, again, it is not intended that the invention be limited to any particular angular configuration or number of severed sections. It will be understood that the angular connection between a half section of the complete pipe coupling would form an angular connection at half the angle of the complete coupling. It should be further understood, however, that the original pipe coupling does not necessarily need to be divided into two identical connections. That is, plane 16 and the reduced diameter portions adjacent thereto could be moved anywhere along fitting 10. For example, but not by way of limitation, plane 16 could be positioned such that upon severing of the two sections, one section could provide a 60° angle connection and the other a 30° angle section. Obviously, the sum of the angles of the connections must equal the total angular connection of the unsevered fitting.

It will be perceived from the foregoing description of the invention and the discussion of the manner in which it is used, that the present invention provides an air duct fitting which may be easily formed, is easily installed by virtue of its being an integrally formed unit, has an extended service life by reason of having a non-metallic material of construction, and provides versatility in piping of an air duct system in that it could be readily adapted to provide different angular connections between ducts. Thus, the invention is highly useful in increasing the versatility of air conditioning and heating ducts, and the ease with which it can be used and adapted by a contractor to confront and make a satisfactory installation is readily apparent.

While a presently preferred embodiment of the air duct fitting of the present invention is shown for the purposes of this disclosure, numerous changes in the arrangement and construction of parts may be made by those skilled in the art. All such changes are encompassed within the scope and spirit of the appended claims.

What is claimed is:

1. A fitting comprising a plurality of integrally formed sections, wherein each section has means for connecting to a pair of ducts and wherein:

the fitting may be used as an integral unit having end portions adapted for connecting a pair of ducts at a predetermined angular relationship to one another; and said sections may be severed from one another such that each of said severed sections has end portions adapted for individually connecting a pair of ducts at a different angular relationship to one another.

2. The fitting of claim 1 further comprising a pair of adjacent reduced diameter portions, one of said adjacent reduced diameter portions being part of said means of one of said sections, and the other of said adjacent reduced diameter portions being a part of said means of an adjacent section.

3. The fitting of claim 2 wherein a groove is defined between said adjacent reduced diameter portions.

4. The fitting of claim 1 wherein adjacent sections are initially integrally connected along a common plane.

5. A fitting comprising:
a first section having means for connecting to a pair of ducts; and
a second section integrally formed with said first section, said second section having means for connecting to a pair of ducts; wherein:
the fitting may be used as an integral unit having end portions adapted for connecting a pair of ducts at a predetermined angular relationship to one another; and
said first and second sections may be severed from one another such that each of said first and second sections has end portions adapted for individually connecting a pair of ducts at a different angular relationship to one another.

6. The fitting of claim 5 wherein:
said integral unit may connect ducts at an angle of approximately 90°; and
said first and second sections may each connect ducts at an angle of approximately 45°.

7. The fitting of claim 5 wherein said first and second sections are initially integrally connected along a common plane.

8. The fitting of claim 5 formed of a thin wall, nonmetallic material.

9. The fitting of claim 5 further comprising:
a reduced diameter portion formed on an end of the fitting and being a part of said means of said first section; and
a reduced diameter portion formed on another end of the fitting and being a part of said means of said second section.

10. The fitting of claim 9 further comprising a pair of adjacent reduced diameter portions, one of said adjacent reduced diameter portions being part of said means of said first section, and the other of said adjacent reduced diameter portions being a part of said means of said second section.

11. The fitting of claim 10 wherein a V-shaped groove is defined between said adjacent reduced diameter portions.

12. The fitting of claim 11 wherein said V-shaped groove defines a plane along which said first and second sections may be severed from one another.

13. A hollow elbow fitting adapted for connecting a pair of lengths of duct at a predetermined angle, said fitting comprising:
a first section having means for connecting to a pair of ducts; and
a second section integrally formed with said first section and severable therefrom, said second section having means for connecting to a pair of ducts;
wherein, when said first and second sections are severed from one another, both of said first and second sections have end portions which may be individually used for connecting the pair of ducts at an angle different from said predetermined angle.

14. The fitting of claim 13 wherein:
said first and second sections are half sections; and
the angle at which said half sections connect the ducts is approximately one-half said predetermined angle.

15. The fitting of claim 13 wherein said predetermined angle is approximately 90°.

16. The fitting of claim 13 wherein said first and second sections are severable along a common plane.

17. The fitting of claim 13 further comprising:
a first end defining a reduced diameter portion thereon adapted for fitting within an open end of one of the lengths of duct, said reduced diameter portion on said first end being a portion of said means of said first section; and
a second end of said fitting defining a reduced diameter portion thereon adapted for fitting within another of the lengths of duct, said reduced diameter portion on said second end being a portion of said means of said second section.

18. The fitting of claim 17 further comprising a shoulder adjacent to each of said reduced diameter portions.

19. The fitting of claim 13 further comprising:
a reduced diameter portion which is a part of said means of said first section; and
a reduced diameter portion which is a part of said means of said second section, said reduced diameter portions being adjacent to one another.

20. The fitting of claim 19 wherein a V-shaped groove is defined between said reduced diameter portions.

21. The fitting of claim 20 wherein said V-shaped groove defines a plane along which said first and second sections may be severed.

22. The fitting of claim 19 further comprising a shoulder adjacent to each of said reduced diameter portions.

* * * * *